(12) United States Patent
Mai et al.

(10) Patent No.: US 8,347,864 B2
(45) Date of Patent: Jan. 8, 2013

(54) METHOD FOR CONTROLLING AN INTERNAL COMBUSTION ENGINE AND INTERNAL COMBUSTION ENGINE

(75) Inventors: Wolfgang Mai, Kronberg (DE); Jens Pache, Kaufungen (DE)

(73) Assignee: Continental Automotive GmbH, Hannover (DE)

( * ) Notice: Subject to any disclaimer, the term of this patent is extended or adjusted under 35 U.S.C. 154(b) by 722 days.

(21) Appl. No.: 12/527,038

(22) PCT Filed: Jan. 29, 2008

(86) PCT No.: PCT/EP2008/051058
§ 371 (c)(1),
(2), (4) Date: Aug. 13, 2009

(87) PCT Pub. No.: WO2008/101770
PCT Pub. Date: Aug. 28, 2008

(65) Prior Publication Data
US 2010/0031932 A1    Feb. 11, 2010

(30) Foreign Application Priority Data
Feb. 19, 2007   (DE) .......................... 10 2007 008 119

(51) Int. Cl.
*F02M 33/02*    (2006.01)
*F02D 41/30*    (2006.01)
(52) U.S. Cl. .......................... 123/520; 701/104; 123/674
(58) Field of Classification Search .......... 123/518–520, 123/674, 698, 516, 672, 703; 701/104; 137/1, 137/12
See application file for complete search history.

(56) References Cited

U.S. PATENT DOCUMENTS

| | | | | |
|---|---|---|---|---|
| 5,044,341 A | | 9/1991 | Henning et al. | |
| 5,072,712 A | | 12/1991 | Steinbrenner et al. | |
| 5,125,385 A | * | 6/1992 | Frinzel | 123/698 |
| 5,193,512 A | * | 3/1993 | Steinbrenner et al. | 123/520 |
| 5,216,997 A | | 6/1993 | Osanai et al. | |
| 5,372,117 A | * | 12/1994 | Denz et al. | 123/698 |
| 5,465,703 A | * | 11/1995 | Abe | 123/674 |
| 5,666,925 A | * | 9/1997 | Denz et al. | 123/520 |
| 5,873,350 A | * | 2/1999 | Wild et al. | 123/520 |
| 5,988,151 A | * | 11/1999 | Schneider | 123/698 |
| 6,508,227 B2 | * | 1/2003 | Bochum | 123/295 |
| 7,441,550 B2 | | 10/2008 | Ludwig et al. | |
| 7,865,273 B2 | * | 1/2011 | Posselt et al. | 701/1 |
| 2003/0029427 A1 | * | 2/2003 | Esteghlal | 123/698 |
| 2003/0145837 A1 | * | 8/2003 | Esteghlal et al. | 123/520 |
| 2003/0221675 A1 | * | 12/2003 | Washeleski et al. | 123/497 |
| 2007/0163551 A1 | | 7/2007 | Ludwig et al. | |
| 2008/0195296 A1 | * | 8/2008 | Grunwald et al. | 701/104 |

FOREIGN PATENT DOCUMENTS

| | | |
|---|---|---|
| DE | 3813220 A1 | 11/1989 |
| DE | 3822300 A1 | 1/1990 |
| DE | 18701253 C1 | 3/1998 |
| DE | 102006002717 B3 | 5/2007 |
| EP | 1108815 A1 | 6/2001 |
| GB | 2269028 A | 1/1994 |
| GB | 2293550 A | 4/1999 |

OTHER PUBLICATIONS

International Search Report, PCT/EP2008/051058, 12 pages, Jun. 4, 2008.
German Office Action, German application No. 10 2007 008 119.9-26, Aug. 7, 2007, 3 pages.

* cited by examiner

*Primary Examiner* — John T. Kwon
*Assistant Examiner* — Johnny Hoang
(74) *Attorney, Agent, or Firm* — King & Spalding L.L.P.

(57) ABSTRACT

An internal combustion engine (1) has a fuel tank (18) and a fuel vapor reservoir (25). According to the method during the tank vent period—before opening the tank vent valve (28) a reference value is updated if a condition is met, and otherwise the existing reference value is maintained, —before opening the tank vent valve (28) an opening period is determined as a function of at least one variable, —the tank vent valve (28) is controlled such that the flow achieves the target flow value by the end of the opening period that was determined, —the load level of the fuel vapor reservoir (25) is computed based on the reference value, —a fuel amount is computed based on the load level, —and the fuel amount to be metered by the injection valve (22) is corrected based on the computer fuel amount.

18 Claims, 3 Drawing Sheets

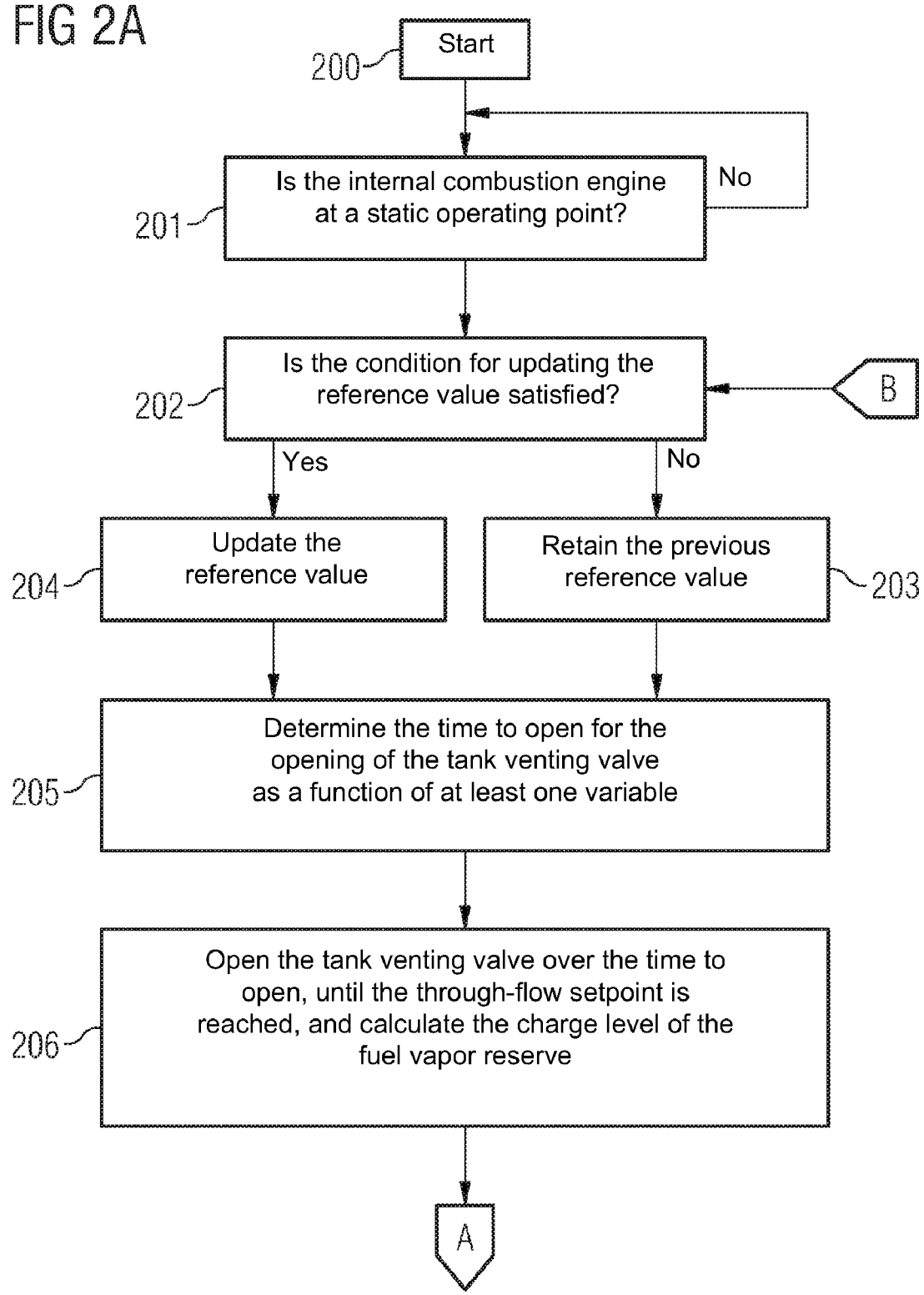

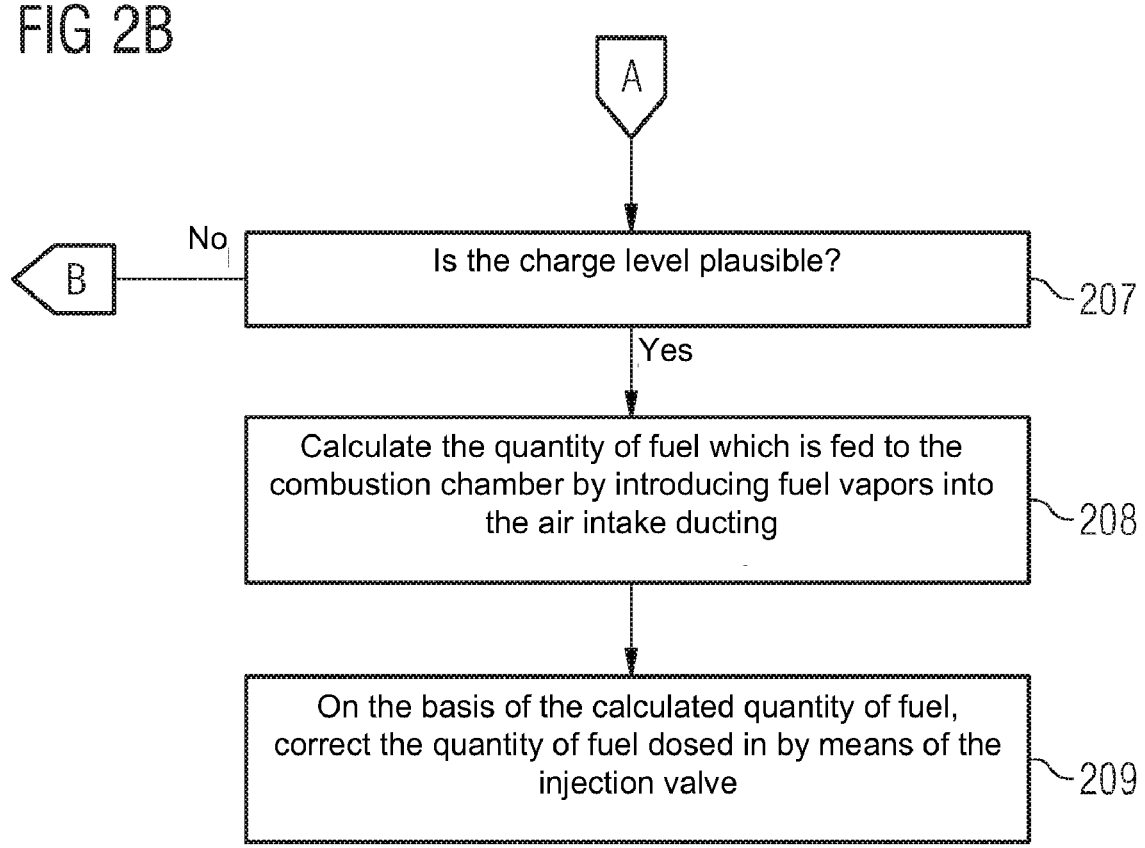

METHOD FOR CONTROLLING AN INTERNAL COMBUSTION ENGINE AND INTERNAL COMBUSTION ENGINE

CROSS-REFERENCE TO RELATED APPLICATIONS

This application is a U.S. National Stage Application of International Application No. PCT/EP2008/051058 filed Jan. 29, 2008, which designates the United States of America, and claims priority to German Application No. 10 2007 008 119.9 filed Feb. 19, 2007, the contents of which are hereby incorporated by reference in their entirety.

TECHNICAL FIELD

The invention relates to a method for controlling an internal combustion engine together with an internal combustion engine having a control device which is designed in such a way that it can carry out the method.

BACKGROUND

Modern motor vehicles often have a tank venting system. By this, the fuel vapors which arise in a fuel tank are adsorbed in an activated carbon container. To regenerate the activated carbon container, a tank venting valve, which is located in a connecting line between the activated carbon container and an induction pipe on the internal combustion engine, is opened during operation of the internal combustion engine so that the fuel vapors stored in the activated carbon container are introduced, by a flushing effect, into the intake ducting of the internal combustion engine and take part in the combustion. This results in a change in the composition of the combustion mixture.

For the purpose of avoiding a raised discharge of pollutants due to this change in the combustion mixture, the known approach is to correct correspondingly the quantity of fuel which is dosed into the combustion chambers of the internal combustion engine by means of injection valves. This corrective operation is also known as an injection quantity correction. However, it is only possible to carry out the injection quantity correction if the amount of fuel fed in by the fuel vapors is known. In accordance with one known method, the level of charging of the activated carbon container with fuel vapor is determined for this purpose. This is effected by slowly opening the tank venting valve over an opening ramp with a prescribed timing. The charge in the activated carbon container and the amount of fuel fed in by the fuel vapors are determined on the basis of the deviation between an output value from a lambda regulator in the motor vehicle after the tank venting valve is opened and a reference value which corresponds to the exhaust gas composition before the tank venting valve is opened.

Determining the charge level of the activated carbon container whilst at the same time avoiding a larger discharge of pollutants calls for a very slow opening of the venting valve, and is therefore time-consuming. In order to permit a larger number of regeneration phases for the activated carbon container, there are known methods by which the tank venting valve is opened at different speeds depending on the length of time which has elapsed since the last regeneration phase. If the time which has elapsed since the last regeneration phase is very short, the assumption is made that the level of charge of the activated carbon container calculated at the last regeneration phase, and the reference value on which the calculation of the charge level is based, are still valid. This permits a very rapid opening of the tank venting valve whilst carrying out an injection quantity correction based on the charge level and reference value which are already known. In the case of a regeneration phase which lies further back, a new determination of the charge level of the activated carbon container is necessary, and both the reference value and the charge level must be predetermined. This in turn calls for a very slow opening of the tank venting valve. The frequency of regeneration phases for the activated carbon container can be raised by the method cited above. However, the rigid differentiation between two speed levels for the opening of the tank venting valve, and the determination of the reference value as a function of the length of time which has passed since the last regeneration phase can prove to be inflexible and, in respect of reducing the discharge of pollutants, inadequate.

SUMMARY

According to various embodiments, a method and an internal combustion engine can be provided by means of which the frequency of the regeneration phases for the activated carbon container can be raised and the discharge of pollutants reduced.

According to an embodiment, a method for controlling an internal combustion engine which has—a fuel tank,—a fuel vapor reservoir for storing fuel vapors which escape from the fuel tank,—a controllable tank venting valve, which is arranged in a connecting line between the fuel vapor reservoir and air intake ducting of the internal combustion engine in order, during a tank venting period, to introduce into the air intake ducting fuel vapors from the fuel vapor reservoir,—at least one injection valve, which is connected to the fuel tank and by means of which the fuel can be dosed in, whereby during the tank venting period, in accordance with the method—if a condition is satisfied, a reference value which represents a measure of the composition of the exhaust gas from the internal combustion engine and which is used as the basis for determining the charge level of the fuel vapor reservoir, is updated before the tank venting valve is opened, and otherwise the previous reference value is retained,—before the tank venting valve is opened an opening period is determined, as a function of at least one variable, within which the tank venting valve is to be opened from a closed state up until a prescribed through-flow setpoint is reached,—the tank venting valve is actuated in such a way that the through-flow reaches the through-flow setpoint by the end of the opening period which has been determined,—the charge level for the fuel vapor reservoir is calculated on the basis of the reference value,—a fuel quantity is calculated, on the basis of the charge level, and this is fed to a combustion chamber in the internal combustion engine by the introduction of the fuel vapors into the air intake ducting,—the fuel quantity to be dosed in by means of the injection valve is corrected on the basis of the calculated fuel quantity.

According to a further embodiment, the condition may be satisfied if, at the start of the tank venting period, a current operating point of the internal combustion engine deviates from the operating point of the internal combustion engine at which the reference value was previously determined. According to a further embodiment, the condition may be satisfied if, at the start of the tank venting period, the current reference value deviates from the previous reference value. According to a further embodiment, the reference value may be an output value from a lambda regulator assigned to the internal combustion engine. According to a further embodiment, the reference value may be an output value from a lambda sensor in the internal combustion engine. According to a further embodiment, the variable can be the time which has passed since the last tank venting period, and the longer this time is the greater is the opening period. According to a further embodiment, the variable can be a first amount, by which the current operating point of the internal combustion engine at the start of the tank venting period deviates from the operating point of the internal combustion engine at the start of the preceding tank venting period, and the larger the first amount is the greater is the opening duration. According to a further embodiment, the variable can be the magnitude of the difference between the ambient temperature of the internal combustion engine during the preceding tank venting period and that during the current tank venting period, and the greater the magnitude of this difference the greater is the opening duration. According to a further embodiment, before the quantity of fuel is calculated a plausibility check may be made on the charge level and the step to actuate the tank venting valve and the calculation of the charge level is repeated if the calculated charge level is adjudged to be implausible. According to another embodiment, an internal combustion engine may comprise a fuel tank, a fuel vapor reservoir for storing fuel vapors which escape from the fuel tank, a controllable tank venting valve, which is arranged in a connecting line between the fuel vapor reservoir and air intake ducting of the internal combustion engine in order, during a tank venting period, to introduce into the air intake ducting fuel vapors from the fuel vapor reservoir, at least one injection valve, which is connected to the fuel tank and by means of which the fuel can be dosed in, and a control device, which is designed in such a way that, during the tank venting period—if a condition is satisfied, a reference value which represents a measure of the composition of the exhaust gas from the internal combustion engine and which is used as the basis of determining a charge level of the fuel vapor reservoir, is updated before the tank venting valve is opened, and otherwise the previous reference value is retained,—before the tank venting valve is opened an opening period is determined, as a function of at least one variable, within which the tank venting valve is to be opened from a closed state up until a prescribed through-flow setpoint is reached,—the tank venting valve is actuated in such a way that the through-flow reaches the through-flow setpoint by the end of the period which has been determined,—the charge level for the fuel vapor reservoir is calculated on the basis of the reference value,—a fuel quantity is calculated, on the basis of the charge level, and this is fed to a combustion chamber in the internal combustion engine,—the fuel quantity to be dosed in by means of the injection valve is corrected on the basis of the calculated fuel quantity.

BRIEF DESCRIPTION OF THE DRAWINGS

In what follows, the invention is explained in more detail on the basis of an exemplary embodiment, making reference to the figures in the annex. In these figures there are:

FIGS. 2A and 2B an exemplary embodiment of a control method for an internal combustion engine, in the form of a flow diagram;

DETAILED DESCRIPTION

Figure 1:
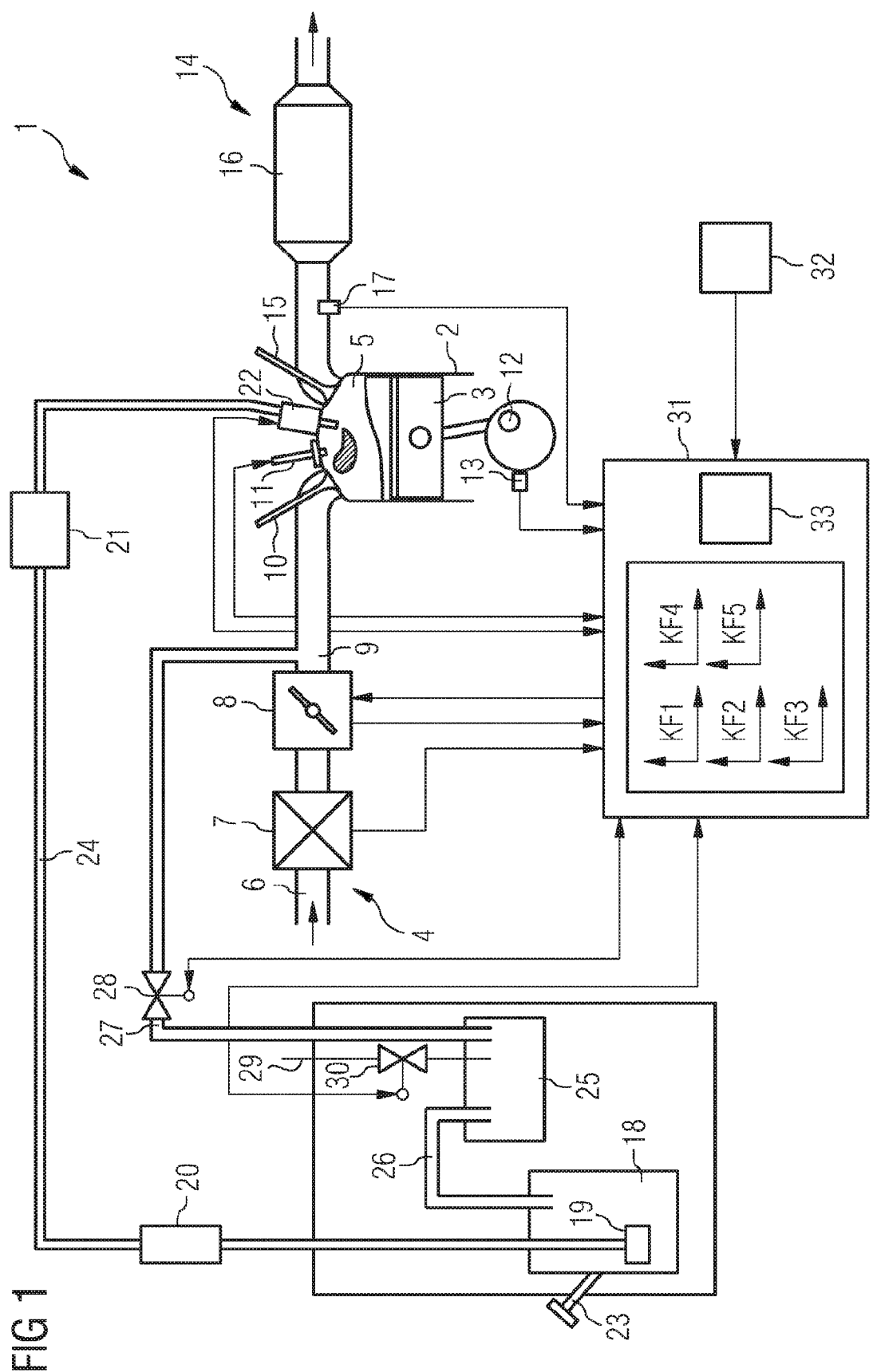
FIG. 1 a schematic of an internal combustion engine.

A control method in accordance with an embodiment refers to an internal combustion engine with a fuel tank and a fuel vapor reservoir for storing fuel vapors which escape from the fuel tank. The internal combustion engine has in addition a controllable tank venting valve, which is arranged in a connecting line between the fuel vapor reservoir and air intake ducting on the internal combustion engine in order, during a tank venting period, to introduce into the air intake ducting fuel vapors from the fuel vapor reservoir. The internal combustion engine incorporates in addition at least one injection valve which is connected to the fuel tank and by means of which the fuel can be dosed in. The method is distinguished by the fact that, during the tank venting period and before the opening of the tank venting valve, if a condition is satisfied then a reference value, which represents a measure of the composition of the exhaust gas from the internal combustion engine, and which is used as the basis for the determination of a charge level of the fuel vapor reservoir, is updated, and otherwise the previous reference value is retained. Before the tank venting valve is opened an opening period is determined, as a function of at least one variable, within which the tank venting valve is to be opened from a closed state up until a prescribed through-flow setpoint is reached. The tank venting valve is actuated in such a way that the through-flow reaches the through-flow setpoint by the end of the calculated opening period. The charge value for the fuel vapor reservoir is calculated on the basis of the reference value. After this a fuel quantity is calculated, on the basis of the charge level, and this is fed to a combustion chamber in the internal combustion engine by the introduction of the fuel vapors into the air intake ducting. Finally, the fuel quantity to be dosed in by means of the injection valve is corrected on the basis of the calculated fuel quantity.

In distinction from the prior art, the determination of the reference value, the accuracy of which has a direct effect on the accuracy of the charge level of the fuel vapor reservoir, and the determination of the opening period for the opening of the tank venting valve, are decoupled from each other, and are no longer rigidly dependent on the time which has passed since the last tank venting period. Use of the method makes it possible to carry out the determination of the reference value as a function of a freely-definable condition, and independently of the determination of the opening period for the tank venting valve. Further, it is possible to carry out the determination of the opening period as a function of a freely-definable variable, independently of the determination of the reference value. This increased flexibility enables the tank venting operation to be better adapted to the relevant circumstances and, as will later become clear when the exemplary embodiment is described, the frequency of the tank venting operations to be significantly increased and the discharge of pollutants to be significantly reduced by an improvement in the injection quantity correction. Among other reasons this is connected with the fact that the need for updating the reference value and the defining of an opening period for the opening of the tank venting valve are dependent on different criteria.

In one exemplary embodiment of the method as claimed in claim 2, the condition is satisfied if, at the start of the tank venting period, the current operating point of the internal combustion engine deviates from the operating point of the internal combustion engine at which the reference value was previously determined.

With this form of embodiment of the method, consideration is given to the fact that the reference value can assume different values because the control setpoint values for the lambda regulator differ at different operating points of the internal combustion engine. In accordance with this embodiment, the condition for an updating of the reference value is therefore satisfied if the current operating point deviates from the operating point of the internal combustion engine at which the reference value was previously determined. This prevents an erroneous calculation of the charge level being effected solely because of a change in the lambda regulator level due to the operating point. Since the injection quantity correction is heavily dependent on the accuracy of the charge level, it is thus possible to reduce the discharge of pollutants.

In accordance with one embodiment of the method as claimed in claim 3, the condition is satisfied if, at the start of the tank venting period, the current reference value deviates from the previous reference value.

In this case, for the purpose of avoiding a change to the reference value, and thereby avoiding a calculation of an incorrect charge level, the current reference value is read in and is compared to the stored previous reference value. By this means, the reference value will only be updated when necessary.

In the case of the embodiments of the method as claimed in claims 4 and 5, the reference value is either an output value from a lambda regulator assigned to the internal combustion engine, or an output value from a lambda sensor in the internal combustion engine.

Both the output value from the lambda regulator and also the output value from the lambda sensor are available as standard in a control device for the internal combustion engine, and supply reliable values which can be regarded as a measure of the composition of the exhaust gas from the internal combustion engine.

In a further embodiment, the variable is the time which has passed since the last tank venting period and the longer this time is the greater is the opening period.

With this embodiment, account is taken of the fact that the longer in the past the last tank venting period lies the greater is the charge level of the fuel vapor reservoir. Accordingly, the longer this time is, the greater the opening period for the tank venting valve is set. The slower opening of the tank venting valve which results from this permits an accurate determination of the charge level, a correspondingly correctly adjusted injection quantity correction, and thereby prevents a high discharge of pollutants when the tank venting valve is opened.

In a further embodiment of the method the variable is a first amount, by which the current operating point of the internal combustion engine at the start of the tank venting period deviates from the operating point of the internal combustion engine at the start of the preceding tank venting period, and the larger this amount is the greater is the opening duration.

As has already been mentioned in relation to one embodiment, for different operating points of the internal combustion engine there are also different operating levels of the lambda regulator, due to the different control setpoint values. For this reason it can also be logical, in the event of a larger deviation of the current operating point from the operating point for the preceding tank venting period, to increase the opening duration, or to open the tank venting valve more slowly, in order thereby to permit a more precise injection quantity correction.

According to a further embodiment of the method, the variable is the magnitude of the difference between the ambient temperature of the internal combustion engine during the preceding tank venting period and that during the current tank venting period, where the greater the magnitude of this difference the greater is the opening duration.

This embodiment of the method takes account of the fact that as the temperature rises the fuel in the fuel tank tends to give off gas more strongly, which leads to heavier charging of the fuel vapor reservoir. Because of the increase in the opening duration as the temperature difference increases, the tank venting valve is opened more slowly, which permits a more precise injection quantity correction and a reduction in the discharge of pollutants, particularly at the start of the tank venting phase.

In yet a further embodiment of the method, the variable is a third quantity, by which the calculated charge level deviates from a prescribed limit value for the charge level.

This embodiment is a type of plausibility check on the calculated charge level. If the calculated value of the charge level deviates from a prescribed limit value, which represents a plausibility limit, then the opening duration can be set to a maximum value in order to permit a more accurate calculation of the charge level.

An internal combustion engine according to an embodiment incorporates a control device which is designed in such a way that it can carry out the method as described above. For the advantages which are given by this internal combustion engine, refer to the embodiments in relation to the method.

FIG. 1 shows an exemplary embodiment of an internal combustion engine 1. The internal combustion engine 1 has at least one cylinder 2 and a piston 3 which can move up and down in the cylinder 2. The fresh air required for combustion is introduced via intake ducting 4 into a combustion chamber 5, bounded by the cylinder 2 and the piston 3. Downstream from an intake opening 6 and located in the intake ducting 4 are an air mass sensor 7 for sensing the air throughput in the intake ducting 4, which can be regarded as a measure of the load on the internal combustion engine 1, a throttle valve 8 for controlling the air throughput, an induction pipe 9 and an inlet valve 10, by means of which the combustion chamber 5 can be connected to or separated from the intake ducting 4.

The combustion is ignited by means of an ignition plug 11. The drive power generated by the combustion is transmitted to the drive train of the vehicle (not shown) via a crankshaft 12. A rotation speed sensor 13 senses the rotation speed of the internal combustion engine 1.

The combustion exhaust gases are led away through an exhaust ducting 14 in the internal combustion engine 1. The combustion chamber 5 is connected to the exhaust ducting 14 or separated from it by means of an outlet valve 15. The exhaust gases are cleaned in an exhaust gas cleaning catalytic converter 16. Located in the exhaust ducting 14 there is also a so-called lambda sensor 17 for measuring the oxygen content of the exhaust gas. The lambda sensor 17 may be either a binary lambda sensor 17 or a linear lambda sensor 17.

The internal combustion engine 1 incorporates in addition a fuel supply facility with a fuel tank 18, a fuel pump 19, a high-pressure pump 20, a pressure reservoir 21 and at least one controllable injection valve 22. The fuel tank 18 has a closable filler pipe 23 for filling up with fuel. The fuel is fed to the injection valve 22 via a fuel supply line 24 by means of the fuel pump 19. The high-pressure pump 20 and the pressure reservoir 21 are arranged in the fuel supply line 24. The function of the high-pressure pump 20 is to feed the fuel to the pressure reservoir 21 at high pressure. Here, the pressure reservoir 21 is designed as a shared pressure reservoir 21 for all the injection valves 22. From it, all injection valves 22 are supplied with fuel under pressure. The exemplary embodiment is an internal combustion engine 1 with direct fuel injection, in which the fuel is injected directly into the combustion chamber 5 by means of an injection valve 22 which projects into the combustion chamber 5. However, it should be noted that the present invention is not restricted to this type of fuel injection, but can also be used with other types of fuel injection, such as for example induction pipe intake.

The internal combustion engine 1 has in addition a tank venting facility. The tank venting facility has a fuel vapor reservoir 25, which may for example be in the form of an activated carbon container, and is connected to the fuel tank 18 via a connecting line 26. The fuel vapors which arise in the fuel tank 18 are led into the fuel vapor reservoir 25 and are adsorbed there by the activated carbon. The fuel vapor reservoir 25 is connected to the induction pipe 9 of the internal combustion engine 1 via a venting line 27. In the venting line 27 there is a controllable tank venting valve 28. In addition, fresh air can be fed to the fuel vapor reservoir 25 via a air-supply line 29 and, optionally arranged in it, a controllable air-supply valve 30. In certain operating ranges of the internal combustion engine 1, in particular when idling or under partial load, there is a large pressure drop between the environment and the induction pipe 9, due to the strong throttling effect through the throttle valve 8. The opening of the tank venting valve and the air supply valve 30 during a tank venting period then produces a flushing effect, by which the fuel vapors stored in the fuel vapor reservoir 25 are fed into the induction pipe 9 and are included in the combustion. The fuel vapors thereby cause a change in the composition of the fuel gases and the exhaust gases.

Assigned to the internal combustion engine 1 is a control device 31, in which engine control functions (KF1 to KF5) based on characteristic curves are implemented in software form. The control device 31 is connected to all the actuators and sensors on the internal combustion engine 1 via signal and data lines. In particular, the control device 31 is connected to the controllable air supply valve 30, the controllable tank venting valve 28, the air mass sensor 7, the controllable throttle valve 8, the controllable injection valve 22, the ignition plug 11, the lambda sensor 17, the rotation speed sensor 13 and an ambient temperature sensor 32 for measuring the ambient temperature.

Parts of the internal combustion engine 1 and the control device 31 form a lambda regulation facility. The lambda regulation facility incorporates, in particular, the lambda sensor 17, a lambda regulator 33 implemented by software in the control device 31, together with the injection valves 22 and their actuation mechanism, with which the opening times of the injection valves 22 are controlled. The lambda regulation facility forms a closed loop lambda control circuit and is designed in such a way that a deviation in the exhaust gas composition from a prescribed lambda setpoint value, detected by the lambda sensor 17, is corrected by means of an injection quantity correction. If the tank venting valve 28 is opened during the tank venting period, then as a result of the pressure drop fuel vapors flow from the fuel vapor reservoir 25 into the intake ducting 4 or the induction pipe 9, as applicable, of the internal combustion engine 1. These fuel vapors, the concentration of which in the intake air is initially unknown, lead to an enrichment of the combustion mixture, i.e. to an excess of hydrocarbons in the fuel gas and, after its combustion, to a corresponding change in the exhaust gas composition. This causes the lambda value measured by the lambda sensor 17 to fall below the setpoint value of, for example, lambda=1. There is thus a control deviation, which is registered by the lambda regulator 33 and is compensated for by an appropriate change in the output variable from the regulator 33. This is effected by the issuing of a corresponding control variable to the injection valves 22, by which the quantity of fuel injected is appropriately altered for a time until the error has been compensated for. This procedure is referred to below as an injection quantity correction.

For the purpose of reducing the pollutants discharged during the tank venting period, in particular at the start of the tank venting period, an exact calculation is required of the additional quantity of fuel fed into the combustion chamber 5 by the tank venting. For this purpose, the charge level of fuel vapor in the fuel vapor reservoir 25 must first be determined. For the purpose of determining the charge level, the tank venting valve 28 is actuated in such a way as to set a small but defined through-flow. This can be effected, for example, by a pulse width modulated control signal. The change in the combustion mixture which this causes also leads to a change in the exhaust gas composition, which is registered by the lambda sensor 17 or the lambda regulator 33, as applicable. The opening of the tank venting valve 28 results in a deviation in the output value of the lambda regulator 33 or the lambda sensor 17, as applicable, compared to that at the point in time before the tank venting valve 28 is opened. The output value of the lambda regulator 33, or alternatively of the lambda sensors 17, prior to the opening of the tank venting valve 28 is referred to below as the reference value. The difference between this reference value and the output value of the lambda regulator 33 or of the lambda sensor 17, as applicable, after the tank venting valve is opened is used to determine the charge level of the fuel vapor reservoir 25, by means of a physical model.

FIGS. 2A and 2B show, in the form of a flow diagram, an exemplary embodiment of a method for controlling an internal combustion engine.

A short time after the start of the internal combustion engine 1, the method is started at step 200. Then, in step 201, a check is made as to whether the operating point of the internal combustion engine 1 is static. The operating point of the internal combustion engine 1 is here defined, for example, by the rotational speed of the crankshaft 12 and the mass flow of fresh air in the intake ducting 4, referred to below as the load. The operating point is regarded as static if the rotational speed and the load are constant over a certain period, or change only within a narrow prescribed range. If the operating point is not static, the query 201 is repeated.

If the operating point is static, then a check is made in step 202 as to whether a condition for the updating of the reference value is satisfied. As already mentioned briefly above, the reference value is used as the basis for determining the charge level of the fuel vapor reservoir 25. The reference value is intended to represent a measure of the composition of the exhaust gas from the internal combustion engine during the tank venting period, but even before the tank venting valve 28 is opened. In what follows, the output value from the lambda regulator 33 is used by way of example as the reference value.

If the condition for updating the reference value is satisfied, then in step 204 the output value from the lambda regulator 33 is read in afresh, is stored in the control device and there replaces the reference value which was previously valid.

If the condition for updating the reference value is not satisfied, then in step 203 the previous reference value which is stored in the control device 31 will be retained.

From either step 204 or step 203, the method continues with step 205, in which the opening period for the opening of the tank venting valve 28 is determined as a function of at least one variable. The opening period specifies the period within which the tank venting valve 28 is opened from a closed state up to the point when a prescribed through-flow setpoint is reached at the tank venting valve 28. This continuous increase in the degree of opening of the tank venting valve 28 is also referred to as the opening ramp or ramping up of the tank venting valve 28. This means that if the opening period is very short, the tank venting valve 28 is opened very rapidly until the through-flow setpoint is reached, whereas if the opening period is very long the tank venting valve 28 is opened very slowly until the through-flow setpoint is reached.

In step 206, the tank venting valve 28 is now opened in accordance with the opening period determined in step 205, until the through-flow setpoint is reached. Simultaneously the charge level of the fuel vapor reservoir is calculated, even at the start of the opening of the tank venting valve 28, that is to say at the start of the opening period. Depending on the result of the query in step 202, the calculation of the charge level will be based either on the updated reference value or on the previous reference value. As has already been mentioned further above, for the purpose of calculating the charge level the difference is determined between the reference value, i.e. the output value from the lambda regulator 33 before the tank venting valve 28 is opened, and the output value from the lambda regulator 33 at a defined, prescribed through-flow at the tank venting valve after the tank venting valve 28 is opened. From this it is possible, using a physical model, to draw a conclusion about the charge level of the fuel vapor reservoir. With a knowledge of the charge level it is then possible, likewise on the basis of a physical model, to calculate the additional quantity of fuel being fed to the combustion chamber 5 by the tank venting, as a function of the degree of opening of the tank venting valve. This quantity of fuel is taken into account in the determination of the quantity of fuel dosed in via the injection valves 22.

In step 207 a check is made as to whether the calculated charge level is plausible. This can be realized, for example, by comparing the calculated charge level with prescribed limit values. If it is determined in step 207 that the calculated charge value is implausible, for example because of a computer error, then the method continues at step 202, so that a recalculation of the charge level takes place.

However, if the charge level is assessed as plausible in step 207, then the method continues with step 208, where a calculation is made of the quantity of fuel which is fed into the combustion chamber 5 by the introduction of the fuel vapors into the air intake ducting 4.

Then in step 209 the quantity of fuel dosed in by means of the injection valve is corrected on the basis of the quantity of fuel calculated in step 209. This ensures that even with the feeding in of fuel vapors as a result of tank venting, the air/fuel vapor ratio is adjusted in such a way as to result in favorable combustion at the same time as a reduction in the pollutants. The method can then be repeated from step 200, or alternatively terminated.

The invention claimed is:

1. A method for controlling an internal combustion engine which has:
   a fuel tank,
   a fuel vapor reservoir for storing fuel vapors which escape from the fuel tank,
   a controllable tank venting valve, which is arranged in a connecting line between the fuel vapor reservoir and air intake ducting of the internal combustion engine in order, during a current tank venting period, to introduce into the air intake ducting fuel vapors from the fuel vapor reservoir,
   at least one injection valve, which is connected to the fuel tank and by means of which the fuel can be dosed in,
   wherein the current tank venting period includes a start time;
   the method comprising the following steps during the current tank venting period:
      retaining a previous reference value which represents a composition of exhaust gas from the internal combustion engine during a previous tank venting period;
      if a condition is satisfied, determining a current reference value for the current tank venting period which represents a composition of exhaust gas from the internal combustion engine during the current tank venting period;
      determining the charge level of the fuel vapor reservoir before the tank venting valve is opened based at least in part on the current reference value, and otherwise retaining the previous reference value,
      before the tank venting valve is opened, determining a duration of an opening period, within which the tank venting valve is to be opened from a closed state up until a prescribed through-flow setpoint is reached,
      actuating the tank venting valve so that the through-flow reaches the through-flow setpoint within the determined duration of the opening period,
      and
      calculating a fuel quantity, based at least in part on the charge level, and feeding the calculated fuel quantity to a combustion chamber in the internal combustion engine by the introduction of the fuel vapors into the air intake ducting, wherein
      the fuel quantity to be dosed in by means of the injection valve is corrected on the basis of the calculated fuel quantity.

2. The method according to claim 1, wherein the condition is satisfied if, at the start time of the tank venting period, a current operating point of the internal combustion engine deviates from the operating point of the internal combustion engine at which the reference value was previously determined.

3. The method according to claim 1, wherein the condition is satisfied if, at the start time of the tank venting period, the current reference value deviates from the previous reference value.

4. The method according to claim 3, wherein the reference value is an output value from a lambda regulator assigned to the internal combustion engine.

5. The method according to claim 3, wherein the reference value is an output value from a lambda sensor in the internal combustion engine.

6. The method according to claim 1, wherein the determination of the duration of the opening period depends at least in part on an amount of time which has passed since the previous tank venting period and the opening period is proportional to the amount of time which has passed.

7. The method according to claim 1, wherein the determination of the duration of the opening period depends at least in part on a first amount, by which a current operating point of the internal combustion engine at the start time of the tank venting period deviates from the operating point of the internal combustion engine at a start time of the previous tank venting period, and duration of the opening period is proportional to the first amount.

8. The method according to claim 1, wherein the determination of the duration of the opening period depends at least in part on a magnitude of the difference between an ambient temperature of the internal combustion engine sensed during the previous tank venting period and an ambient temperature sensed during the current tank venting period, and the opening period is proportional to the magnitude of the difference.

9. The method according to claim 1 wherein before the quantity of fuel is calculated a plausibility check is made on the charge level and the step to actuate the tank venting valve and the calculation of the charge level is repeated if the calculated charge level is adjudged to be implausible.

10. An internal combustion engine comprising:
    a fuel tank, a fuel vapor reservoir for storing fuel vapors which escape from the fuel tank, a controllable tank venting valve, which is arranged in a connecting line between the fuel vapor reservoir and air intake ducting of the internal combustion engine in order, during a current tank venting period, to introduce into the air intake ducting fuel vapors from the fuel vapor reservoir, wherein the current tank venting period includes a start time;

at least one injection valve, which is connected to the fuel tank and by means of which the fuel can be dosed in, and a control device, which during the current tank venting period is operable to retain a previous reference value which represents a composition of exhaust gas from the internal combustion engine during a previous tank venting period;

if a condition is satisfied, to determine a current reference value which represents a composition of the exhaust gas from the internal combustion engine during the current tank venting period to determine a charge level of the fuel vapor reservoir before the tank venting valve is opened based at least in part on the current reference value, before the tank venting valve is opened, to determine a duration of an opening period within which the tank venting valve is to be opened from a closed state up until a prescribed through-flow setpoint is reached, to actuate the tank venting valve so that the through-flow reaches the through-flow setpoint within the determined duration of the period, to calculate a fuel quantity, based at least in part on the charge level, to feed the calculated fuel quantity to a combustion chamber in the internal combustion engine, and to correct the fuel quantity to be dosed in by means of the injection valve based at least in part on the calculated fuel quantity.

11. The internal combustion engine according to claim 10, wherein the condition is satisfied if, at the start time of the tank venting period, a current operating point of the internal combustion engine deviates from the operating point of the internal combustion engine at which the reference value was previously determined.

12. The internal combustion engine according to claim 10, wherein the condition is satisfied if, at the start time of the tank venting period, the current reference value deviates from the previous reference value.

13. The internal combustion engine according to claim 12, wherein the reference value is an output value from a lambda regulator assigned to the internal combustion engine.

14. The internal combustion engine according to claim 12, wherein the reference value is an output value from a lambda sensor in the internal combustion engine.

15. The internal combustion engine according to claim 10, wherein the determination of the duration of the opening period depends at least in part on an amount of time which has passed since the previous tank venting period, and the duration of the opening period is proportional to the amount of time.

16. The internal combustion engine according to claim 10, wherein the determination of the duration of the opening period depends at least in part on a difference between a current operating point of the internal combustion engine at the start time of the tank venting period and an operating point of the internal combustion engine at the start time of the previous tank venting period, and the duration of the opening period is proportional to the difference.

17. The internal combustion engine according to claim 10, wherein the determination of the duration of the opening period depends at least in part on a difference between an ambient temperature of the internal combustion engine sensed during the previous tank venting period and an ambient temperature of the internal combustion engine sensed during the current tank venting period, and the duration of the opening period is proportional to the difference.

18. The internal combustion engine according to claim 10, wherein before the quantity of fuel is calculated a plausibility check is made on the charge level and the step to actuate the tank venting valve and the calculation of the charge level is repeated if the calculated charge level is adjudged to be implausible.

* * * * *